(12) United States Patent
Nakamura et al.

(10) Patent No.: US 11,687,425 B2
(45) Date of Patent: Jun. 27, 2023

(54) FAULT TOLERANT SYSTEM, SERVER, AND OPERATION METHOD OF FAULT TOLERANT SYSTEM

(71) Applicant: NEC Platforms, Ltd., Kawasaki (JP)

(72) Inventors: Teruo Nakamura, Kanagawa (JP); Yuji Imai, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 34 days.

(21) Appl. No.: 17/612,715

(22) PCT Filed: Mar. 27, 2020

(86) PCT No.: PCT/JP2020/014384
§ 371 (c)(1),
(2) Date: Nov. 19, 2021

(87) PCT Pub. No.: WO2020/241032
PCT Pub. Date: Dec. 3, 2020

(65) Prior Publication Data
US 2022/0327034 A1    Oct. 13, 2022

(30) Foreign Application Priority Data
May 29, 2019 (JP) .............................. JP2019-100508

(51) Int. Cl.
*G06F 11/00* (2006.01)
*G06F 11/20* (2006.01)

(52) U.S. Cl.
CPC ...... *G06F 11/2094* (2013.01); *G06F 2201/85* (2013.01)

(58) Field of Classification Search
CPC ............... G06F 11/2028; G06F 11/208; G06F 11/2048; G06F 11/2082; G06F 11/2094;
(Continued)

(56) References Cited

U.S. PATENT DOCUMENTS

2005/0159927 A1    7/2005  Cruz et al.
2005/0172161 A1*   8/2005  Cruz ................... G06F 11/2025
                                                          714/4.11
(Continued)

FOREIGN PATENT DOCUMENTS

JP    2005-209191 A    8/2005
JP    2009-003631 A    1/2009
(Continued)

OTHER PUBLICATIONS

Yang et al., "A Medical Image File Accessing System with Virtualization Fault Tolerance on Cloud", Advances in Grid and Pervasive Computing, Springer, 7th International Conference, GPC 2012, pp. 338-349 (Year: 2012).*
(Continued)

*Primary Examiner* — Michael Maskulinski
(74) *Attorney, Agent, or Firm* — Sughrue Mion, PLLC

(57) ABSTRACT

A first server and a second server use a virtual address to mount the storage synchronous area in a storage by the NFS. The first server obtains a snapshot of memory content of a virtual system operated as an active system and transmits the snapshot to the second server. The first server replicates content of the storage synchronous area in the storage to a storage synchronous area in a storage. When a failure occurs in the first server, the second server sets a virtual address to the storage and uses the virtual address to mount the storage synchronous area in the storage by NFS. The second server uses the snapshot received from the first server to execute the application on the virtual system.

20 Claims, 9 Drawing Sheets

(58) Field of Classification Search
CPC ........... G06F 2201/815; G06F 2201/84; G06F 2201/85
See application file for complete search history.

(56) References Cited

U.S. PATENT DOCUMENTS

| | | |
|---|---|---|
| 2007/0094659 A1 | 4/2007 | Singh et al. |
| 2010/0107158 A1 | 4/2010 | Chen |
| 2012/0084782 A1* | 4/2012 | Chou .................. G06F 12/08 711/6 |
| 2012/0266018 A1 | 10/2012 | Tanaka |
| 2016/0283251 A1 | 9/2016 | Enomoto et al. |

FOREIGN PATENT DOCUMENTS

| | | |
|---|---|---|
| JP | 2010-211819 A | 9/2010 |
| JP | 2013-186692 A | 9/2013 |
| JP | 2016-177716 A | 10/2016 |

OTHER PUBLICATIONS

International Preliminary Report on Patentability for PCT/JP2020/014384, dated Nov. 16, 2021, English Translation (Year: 2021).*
European Search Report for EP Application No. EP20813979.0 dated May 23, 2022.
International Search Report for PCT Application No. PCT/JP2020/014384, dated Jul. 14, 2020.
Japanese Office Action for JP Application No. 2020-163124 dated Aug. 31, 2021 with English Translation.
Jun Futagawa, Atsushi Shimono and Shuichi Yukita, "The implementation of a fault tolerant server farm using DRBD and virtual machine technology", Information Processing Society of Japan, Internet and Operation Technology Symposium 2008, pp. 105-110.
Yoshiaki Tamura et al., "Kamari: Virtual Machine Synchronization for Fault Tolerance", computer system symposium collected papers, Information Processing Society of Japan, Nov. 19, 2009, the 2009th volume, No. 13, pp. 11-20.
Yoshinori Kanamori, Kenta Hayashi, Kaori Maeda, Tohru Kondo, and Reiji Aibara, "Development of a Global Live Migration Support System using Authentication Mechanism base on Attribute-Based Encryption", Information Processing Society of Japan, Internet and Operation Technology Symposium 2017, IOTS2017, Dec. 7, 2017, pp. 25-32.

* cited by examiner

FAULT TOLERANT SYSTEM, SERVER, AND OPERATION METHOD OF FAULT TOLERANT SYSTEM

This application is a National Stage Entry of PCT/JP2020/014384 filed on Mar. 27, 2020, which claims priority from Japanese Patent Application 2019-100508 filed on May 29, 2019, the contents of all of which are incorporated herein by reference, in their entirety.

TECHNICAL FIELD

The present disclosure is related to a fault tolerant system, a server, an operation method of a fault tolerant system, an operation method of a server, and a program of an operation method of a server.

BACKGROUND ART

An HA (High Availability) cluster of the active/standby type has been known as a computer system with an increased availability. The HA cluster includes a plurality of servers connected to each other. The plurality of servers include an active system server and a standby system server. During normal operation, the active system server executes a process, and, when a failure occurs in the active system server, the standby system server takes over execution of the process. Such a configuration allows the whole cluster to seem to operate with no abnormality.

In this regard, as an HA cluster employing the virtualization technology, the system disclosed in Patent Literature 1 has been known, for example. The system disclosed in Patent Literature 1 includes an active system server, a standby system server, an administration server, and a disk array device. A server virtualization mechanism configured to provide a virtual server is running on the active system server and the standby system server. The administration server obtains a snapshot of a memory image of the virtual server operated on the server virtualization mechanism of the active system server, and stores the snapshot in the disk array device.

When a failure is detected in the active system server, the administration server carries out a process of assigning an OS (Operating System) boot disk in the disk array device, which was used by the failed active system server, to the standby system server. The administration server turns on the standby system server, which boots by using the OS boot disk. The administration server uses the memory image of the virtual server which was operated on the active system server to boot, on the server virtualization mechanism operated on the standby system server, the virtual server which was operated on the active system server.

CITATION LIST

Patent Literature

[Patent Literature 1] Japanese Unexamined Patent Application Publication No. 2010-211819

SUMMARY OF INVENTION

Technical Problem

In Patent Literature 1, the virtual server can be booted on the standby system server through assignment of the OS boot disk, which has been assigned to the active system server, to the standby system server. However, the system disclosed in Patent Literature 1 requires a shared disk array device accessible from both the active system server and the standby system server. Consequently, the system disclosed in Patent Literature 1 cannot be applied to a configuration employing storages individually provided in the active system server and the standby system server without employing a shared disk array device.

In this regard, a DRBD (Distributed Replicated Block Device) has been known as a distributed storage system which can be employed in the HA cluster. The DRBD mirrors a block device (partition) between a plurality of servers via a TCP/IP (Transmission Control Protocol/Internet Protocol) network. The DRBD has a single primary mode and a dual primary mode. In the single primary mode, one of the plurality of servers functions as a primary server which can exclusively update data. On the other hand, in the dual primary mode, all servers function as primary servers and each server can update data.

In the HA cluster employing the single primary mode of the DRBD, data such as a database is stored in a storage synchronous area of the DRBD in the storage. In the HA cluster employing the virtualization technology, when the primary server is down, the storage and the virtual system on the secondary server side are switched from a standby system to an active system. An application on the virtual system of the secondary server switched to the active system refers to the database on its own storage that is storage-synchronized by the DRBD, to execute a process. Such a configuration enables the operating state of the system to continue.

However, in the HA cluster, memory content of the virtualized system of the primary server is not taken over to the virtualized system of the secondary server. Therefore, in a real-time system (application) in which system status is not compiled into a database and is held on memory of the virtualized system, fault tolerance cannot be realized.

In order to synchronize the memory of the virtualized system, the primary server and the secondary server need to use the same disk image to boot the virtualized system. However, in the single primary mode of the DRBD, the standby system cannot mount the storage synchronous area of the DRBD. Consequently, the secondary server, which is the standby system, cannot refer to the disk image and thus cannot boot the virtual system (standby system).

In view of the foregoing, an objective of the present disclosure is to provide a fault tolerant system, a server, an operation method of a fault tolerant system, an operation method of a server, and a program of an operation method of a server, that make it possible to realize fault tolerance while obviating the need for a shared disk array device even in the case in which the system status is not compiled into a database.

Solution to Problem

In order to achieve the aforementioned objective, the present disclosure provides, as a first aspect, a fault tolerant system including: a first server including a first storage configured to store in a storage synchronous area a disk image of a virtual system constructed by using a server virtualization mechanism; and a second server including a second storage, wherein a virtual address is set to the storage synchronous area in the first storage, the first server and the second server each use the virtual address to mount the storage synchronous area in the first storage by NFS (Network File System), the first server operates the virtual system as an active system by using the disk image in the storage synchronous area thus mounted, executes an application on the virtual system thus operated, and obtains and transmits a snapshot of memory content of the virtual system to the second server, the second server operates the virtual system as a standby system by using the disk image in the storage synchronous area thus mounted, stands by for execution of an application on the virtual system thus operated, and receives and stores the snapshot from the first server, the first server replicates content of the storage synchronous area in the first storage to the storage synchronous area in the second storage, and the second server, when a failure occurs in the first server, sets a virtual address to the storage synchronous area in the second storage, uses the virtual address to mount the storage synchronous area in the second storage by the NFS, and uses the snapshot being stored to execute the application on the virtual system.

The present disclosure provides, as a second aspect, a server including: a storage configured to store in a storage synchronous area a disk image of a virtual system constructed by using a server virtualization mechanism; and an application configured to run on the virtual system, wherein the server uses a virtual address being set to the storage synchronous area in the storage to mount the storage synchronous area in the storage by NFS (Network File System), operates the virtual system as an active system by using the disk image in the storage synchronous area thus mounted, executes the application on the virtual system thus operated, obtains and transmits a snapshot of memory content of the virtual system to another server configured to mount the storage synchronous area in the storage by using the virtual address, and replicates content of the storage synchronous area in the storage to a storage synchronous area in a storage of the another server.

The present disclosure provides, as a third aspect, a server including: a storage; and an application configured to run on a virtual system constructed by using a server virtualization mechanism, wherein the server uses a virtual address being set to a storage synchronous area in a storage of another server configured to store a disk image of the virtual system to the storage synchronous area to mount the storage synchronous area in the storage of the another server by NFS (Network File System), operates the virtual system as a standby system by using the disk image in the storage synchronous area thus mounted, stands by for execution of an application on the virtual system thus operated, receives from the another server and stores a snapshot of memory content of the virtual system operated as an active system on the another server by using the disk image, in which an application is executed on the system operated as the active system, and, when a failure occurs in the another server, sets a virtual address to a storage synchronous area in the storage of the server to which content of the storage synchronous area in the storage of the another server is replicated, uses the virtual address to mount the storage synchronous area in the storage of the server by the NFS, and uses the snapshot being stored to execute the application on the virtual system.

The present disclosure provides, as a fourth aspect, an operation method of a fault tolerant system, wherein a first server including a first storage configured to store in a storage synchronous area a disk image of a virtual system constructed by using a server virtualization mechanism, and a second server including a second storage each use a virtual address being set to the storage synchronous area in the first storage, to mount the storage synchronous area in the first storage by NFS (Network File System), the first server operates the virtual system as an active system by using the disk image in the storage synchronous area thus mounted, executes an application on the virtual system thus operated, and obtains and transmits a snapshot of memory content of the virtual system to the second server, the second server operates the virtual system as a standby system by using the disk image in the storage synchronous area thus mounted, stands by for execution of an application on the virtual system thus operated, and stores the snapshot received from the first server, the first server replicates content of the storage synchronous area in the first storage to the storage synchronous area in the second storage, and the second server, when a failure occurs in the first server, sets a virtual address to the storage synchronous area in the second storage, uses the virtual address to mount the storage synchronous area in the second storage by the NFS, and uses the snapshot being stored to execute the application on the virtual system.

The present disclosure provides, as a fifth aspect, an operation method of a server including: using a virtual address being set to a storage synchronous area in a storage of the server configured to store in the storage synchronous area a disk image of a virtual system constructed by using a server virtualization mechanism, to mount the storage synchronous area in the storage by NFS (Network File System); operating the virtual system as an active system by using the disk image in the storage synchronous area thus mounted; executing an application on the virtual system thus operated; obtaining and transmitting a snapshot of memory content of the virtual system to another server configured to mount the storage synchronous area in the storage by using the virtual address; and replicating content of the storage synchronous area in the storage to a storage synchronous area in a storage of the another server.

The present disclosure provides, as a sixth aspect, an operation method of a server including: using a virtual address being set to a storage synchronous area in a storage of another server configured to store in the storage synchronous area a disk image of a virtual system constructed by using a server virtualization mechanism, to mount the storage synchronous area in the storage of the another server by NFS (Network File System); operating the virtual system as a standby system by using the disk image in the storage synchronous area thus mounted; standing by for execution of an application on the virtual system thus operated; receiving from the another server and storing a snapshot of memory content of virtual system operated as an active system on the another server by using the disk image, in which an application is executed on the system operated as the active system; and, when a failure occurs in the another server, setting a virtual address to a storage synchronous area in the storage of the server to which content of the storage synchronous area in the storage of the another server is replicated, using the virtual address to mount the storage synchronous area in the storage of the server by the NFS, and using the snapshot being stored to execute the application on the virtual system.

The present disclosure provides, as a seventh aspect, a program configured to cause a server to carry out the above-described operation method of a server.

Advantageous Effects of Invention

The fault tolerant system, the server, the operation method of a fault tolerant system, the operation method of a server, and the program of an operation method of a server enabling fault tolerance to be realized according to the present disclosure make it possible to realize fault tolerance while obviating the need for a shared disk array device even in the case in which the system status is not compiled into a database.

EXAMPLE EMBODIMENTS

Figure 1:
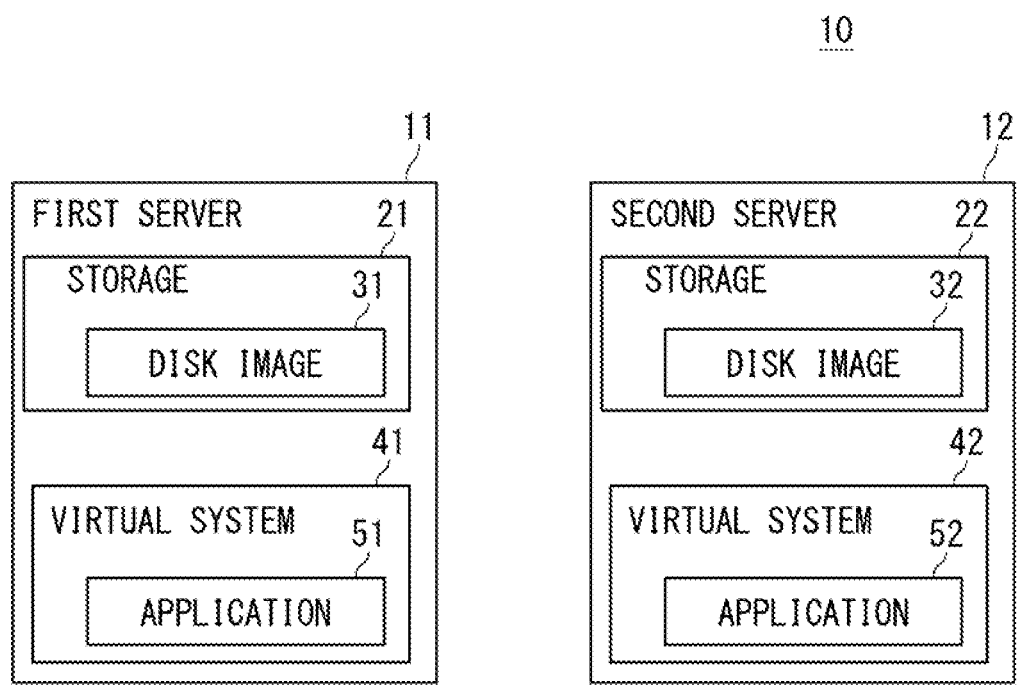
FIG. 1 is a block diagram showing a schematic configuration of a fault tolerant system according to the present disclosure.

A summary of the present disclosure is described prior to description of an example embodiment of the present disclosure. FIG. 1 shows a schematic configuration of the fault tolerant system according to the present disclosure. A fault tolerant system 10 includes a first server 11 and a second server 12. The first server 11 includes a storage 21. The storage 21 includes a storage synchronous area. The storage synchronous area stores a disk image 31 of a virtual system constructed by using a server virtualization mechanism.

The second server 12 includes a storage 22. The first server 11 replicates content of the storage synchronous area in its own storage 21 to a storage synchronous area in the storage 22 of the second server 12. Through replication of the content of the storage synchronous area, a disk image 32, which is the same in content as the disk image 31 of the virtual system stored in the storage 21 in the first server 11, is stored in the storage 22 of the second server 12.

A virtual address is set to the storage synchronous area in the storage 21. The first server 11 and the second server 12 each use the virtual address to mount the storage synchronous area in the storage 21 by the NFS.

The first server 11 operates the virtual system 41 as an active system by using the disk image 31 in the storage synchronous area thus mounted. The first server 11 executes an application 51 on the virtual system 41 thus operated. The first server 11 obtains a snapshot of memory content of the virtual system 41 and transmits the snapshot thus obtained to the second server 12.

The second server 12 operates the virtual system 42 as a standby system by using the disk image 31 in the storage synchronous area thus mounted. The second server 12 stands by for execution of an application 52 on the virtual system 42 thus operated. The second server 12 receives a snapshot of memory content of the virtual system 41 from the first server 11 and stores the snapshot.

When a failure occurs in the first server 11, the second server 12 sets a virtual address to the storage synchronous area in its own storage 22. The second server 12 uses the virtual address thus set to mount the storage synchronous area in the storage 22 by the NFS. In addition, the second server 12 uses the snapshot received from the first server 11 and stored, to execute the application 52 on the virtual system 42.

In the present disclosure, the storage 21 of the first server 11 stores the disk image 31 of the virtual system in the storage synchronous area. The first server 11 and the second server 12 each use the virtual address being set to the storage synchronous area in the storage 21, to mount the storage synchronous area in the storage 21 by the NFS. The first server 11 replicates content of the storage synchronous area to the storage 22 of the second server 12. Such a configuration enables synchronization between the disk image 31 of the virtual system of the storage 21 of the first server 11 and the disk image 32 of the virtual system of the storage 22 of the second server 12.

In this regard, for example in the case of employing the single primary mode of the DRBD for synchronization of the storage synchronous area, the second server 12 cannot mount the storage synchronous area of its own storage 22 being the standby system of the DRBD. In the present disclosure, the second server 12 uses the virtual address to mount the storage synchronous area in the storage 21 of the first server 11. In such a configuration, even though its own storage 22 cannot be directly mounted, the second server 12 can boot the virtual system 42 by using the disk image 31 used for boot of the virtual system 41 in the first server 11. In addition, in the present disclosure, since the second server 12 mounts the storage synchronous area in the storage 21 of the first server 11 by NFS, a shared disk array device or the like commonly accessible from both servers is not required.

Furthermore, in the present disclosure, the first server 11 obtains a snapshot of memory content of the virtual system 41. The second server 12 receives from the first server 11 and stores the snapshot. When a failure occurs in the first server 11, the second server 12 sets a virtual address to the storage synchronous area in its own storage 22 and uses the virtual address to mount the storage synchronous area in the storage 22 by NFS. In addition, the second server 12 uses the snapshot received from the first server 11 to execute the application 52, and thus takes over execution of the application 51 which has been executed on the virtual system 41 of the first server 11. Such a configuration makes it possible to realize fault tolerance while obviating the need for a shared disk array device even in the case in which the system status is not compiled into a database.

Figure 2:
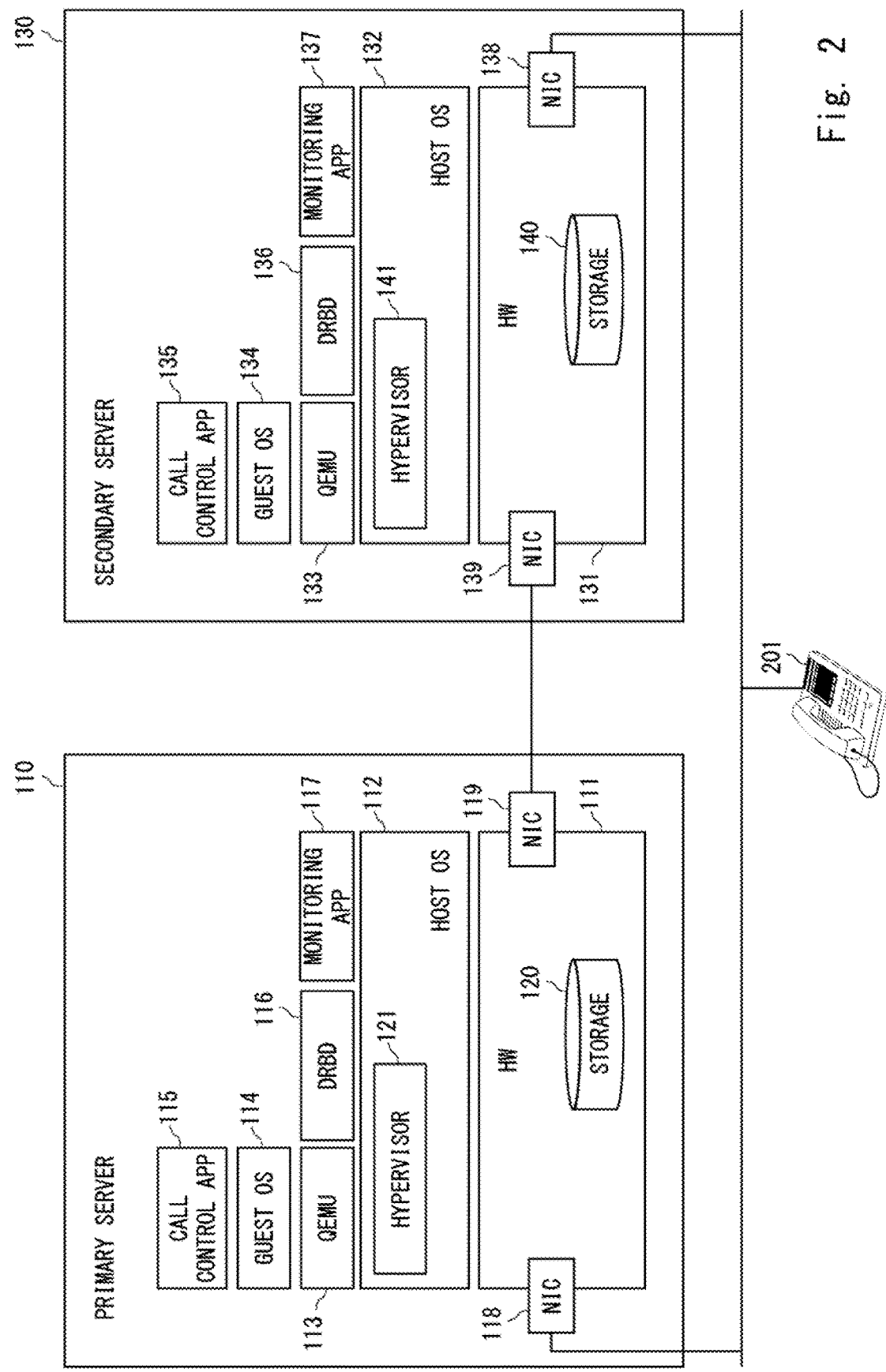
FIG. 2 is a block diagram showing a fault tolerant system according to one example embodiment of the present disclosure.

Hereinafter an example embodiment of the present disclosure is described in detail with reference to the drawings. FIG. 2 shows a fault tolerant system according to one example embodiment of the present disclosure. A fault tolerant system 100 includes a primary server 110 and a secondary server 130. The fault tolerant system 100 corresponds to the fault tolerant system 10 in FIG. 1. The primary server 110 corresponds to the first server 11 in FIG. 1 and the secondary server 130 corresponds to the second server 12 in FIG. 1.

In the present example embodiment, the fault tolerant system 100 is configured as a system of the hot-standby configuration. During normal operation, the primary server 110 operates as the active system. The secondary server 130 is used as the standby system and, when a failure occurs in the primary server 110 being the active system, takes over and carries out the process having been provided in the primary server 110.

The primary server 110 includes, as hardware 111, network interface cards (NICs) 118, 119 and a storage 120. The hardware 111 also includes a processor, memory and the like. The NIC 118 is connected to a telephone 201 and the like via a call control network. The NIC 119 is connected to the secondary server 130 via an FT (Fault Tolerance) network. The storage 120 includes a disk image of a virtual system constructed on the primary server 110. The storage 120 corresponds to the storage 21 in FIG. 1.

The configuration of the secondary server 130 is similar to the primary server 110. The secondary server 130 includes, as hardware 131, NICs 138, 139, and a storage 140. The hardware 131 also includes a processor, memory and the like. The NIC 138 is connected to a telephone 201 and the like via a call control network. The NIC 139 is connected to the primary server 110 via an FT network. The storage 140 corresponds to the storage 22 in FIG. 1.

Note that, although the only one telephone 201 is shown in FIG. 2 for the sake of simplification of the drawing, the primary server 110 and the secondary server 130 may be connected to a plurality of telephones 201 via the call control network. In addition, the device connected to the call control network may be any device having a telephone function, and is not limited to the telephone 201.

In this regard, the storage 120 and the storage 140 include respective storage synchronous areas, of which contents are synchronized. For example, a DRBD, which is a software for replication of storage, is used for synchronization of the storage. The DRBD is a software configured to replicate storages (block devices) in a plurality of servers on a real-time basis via a TCP/IP network. In the present example embodiment, in particular, the contents of the storage synchronous areas (block storages) are mirrored between the primary server 110 and the secondary server 130 by employing the single primary mode of the DRBD.

In the present example embodiment, a virtual IP address (hereinafter also referred to as "ACT IP") is set to the active system of the DRBD. During normal operation, the storage 120 of the primary server 110 is used as the active system of the DRBD and the storage 140 of the secondary server 130 is used as the standby system of the DRBD. The primary server 110 and the secondary server 130 each use the ACT IP to mount the storage synchronous area in the storage 120 by the NFS.

A host OS 112 running on the primary server 110 includes a hypervisor 121. As the host OS 112, for example, a Linux (R)-based OS is used. As the hypervisor 121, for example, a KVM (Kernel-based Virtual Machine) is used. A QEMU 113, a DRBD 116, and a monitoring application 117 run on the host OS 112. The QEMU (Quick Emulator) 113 is an open-source emulator. The QEMU 113 provides virtual hardware and constructs a virtual machine (virtual system) on the host OS 112 (hypervisor 121). A guest OS 114 such as Linux runs on the QEMU 113.

In this regard, in the virtual system operated on the primary server 110, the system status is not compiled into a database, and a real-time system (application) configured to manage the system on memory is operated. Particularly in the present example embodiment, the call control application (hereinafter also referred to as "call control app") 115 is operated as such a real-time application. The call control app 115 runs on the guest OS 114. The call control app 115 is application software configured to carry out call control connecting between an external line and an extension line, or between extension lines. Note that the application executed on the virtual system is not limited to the call control app 115 and may be another application.

The primary server 110 transmits to the secondary server 130 the memory content of the virtual system that may change according to the operation of the call control app 115. The primary server 110 uses, for example, a live migration function (vmotion function) of the KVM to transmit to the secondary server 130 the memory content of the virtual system. For example, the primary server 110 obtains a snapshot of the memory content of the virtual system at predetermined time intervals, e.g., intervals of about several hundred milliseconds to several seconds. The primary server 110 transmits the snapshot thus obtained to the secondary server 130 via the NIC 119. The secondary server 130 receives the snapshot from the primary server 110 via the NIC 139. The secondary server 130 stores the snapshot thus received in a storage device. The secondary server 130, for example, saves by overwriting the snapshot thus received in the storage device.

The DRBD 116 replicates the content of the storage synchronous area in the storage 120 to the storage 140 of the secondary server 130. When the content of the storage synchronous area in the storage 120 is changed, the DRBD 116 transmits content of the change to the secondary server 130. The storage 120 stores the disk image of the virtual system in the storage synchronous area. Through use of the DRBD, the disk image of the virtual system stored in the storage 120 of the primary server 110 and that stored in the storage 140 of the secondary server 130 are maintained the same in content.

The monitoring application (hereinafter also referred to as "monitoring app") 117 monitors operation of the call control app 115 running on the guest OS 114. When the call control app 115 does not operate normally, the monitoring app 117 notifies the secondary server 130 to that effect via the NIC 119. In addition, the monitoring application 117 monitors the secondary server 130 via the NIC 119.

A host OS 132 running on the secondary server 130 includes a hypervisor 141. As the host OS 132, for example, a Linux-based OS is used. As the hypervisor 141, for example, a KVM is used. A QEMU 133, a DRBD 136, and a monitoring application 137 run on the host OS 132. The QEMU 133 provides virtual hardware. The QEMU 133 constructs a virtual machine (virtual system) on the host OS 132 (hypervisor 141).

A guest OS 134 such as Linux runs on the QEMU 133. A call control app 135 runs on the guest OS 134. The call control app 135 is application software configured to carry out call control connecting between an external line and an extension line, or between extension lines. When the call control app 115 operates normally on the primary server 110, the call control app 135 does not operate on the secondary server 130.

The DRBD 136 replicates the content of the storage synchronous area in the storage 120 of the primary server 110 to the storage 140 of the secondary server 130. When the content of the storage synchronous area is changed in the storage 120 of the primary server 110, the DRBD 136 receives content of the change from the primary server 110. The DRBD 136 reflects the content of the change received from the primary server 110 on the storage 140 of the secondary server 130.

The monitoring app 137 monitors operation of the call control app 135 running on the guest OS 134. When the call control app 135 does not operate correctly, the monitoring app 137 notifies the primary server 110 to that effect via the NIC 139. In addition, the monitoring app 137 monitors the primary server 110 via the NIC 139. When a failure occurs in the primary server 110, the secondary server 130 switches the storage synchronous area in the storage 140 to the active system of the DRBD. At this time, the secondary server 130 sets an ACT IP to the storage synchronous area in the storage 140. The secondary server 130 uses the ACT IP to mount the storage synchronous area in the storage 140 by the NFS.

When it is notified from the primary server 110 that the call control app 115 does not operate correctly, and when a failure occurs in the primary server 110, the secondary server 130 switches the virtual system operated on the secondary server 130 to the active system. The secondary server 130 uses the snapshot received from the primary server 110 and stored, to execute the call control app 135 on the virtual system switched to the active system. The call control app 135 takes over the process having been executed by the call control app 115 on the primary server 110. Even when the primary server 110 is down due to a failure, such a configuration enables the secondary server 130 to provide substantially seamlessly the service having been provided on the primary server 110.

Figure 3:
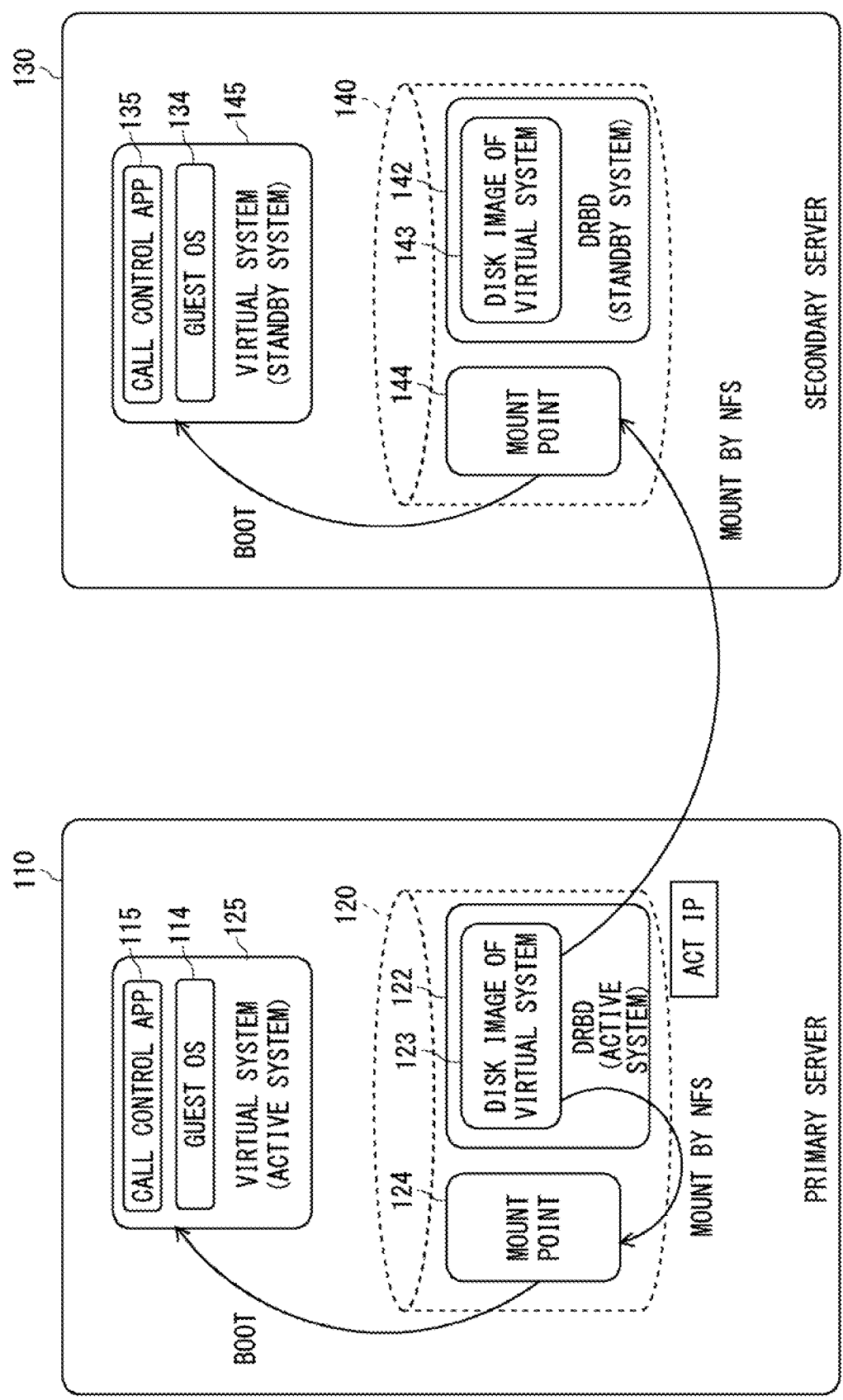
FIG. 3 is a block diagram showing the fault tolerant system during normal operation.

FIG. 3 shows the fault tolerant system 100 during normal operation. The storage 120 of the primary server 110 includes a storage synchronous area 122, which is the active system of the DRBD. The storage synchronous area 122 is configured in, for example, a predetermined folder such as "/drbd_share". A virtual system's disk image (hereinafter also simply referred to as "disk image") 123 is stored in "/drbd_share", which is the storage synchronous area 122. The disk image 123 corresponds to the disk image 31 in FIG. 1.

In addition, the storage 140 of the secondary server 130 includes a storage synchronous area 142, which is the standby system of the DRBD. The storage synchronous area 142 is configured in, for example, a predetermined folder such as "/drbd_share". The DRBD 116 (see FIG. 2) of the primary server 110 transmits the disk image 123 stored in the storage synchronous area 122 to the secondary server 130. The DRBD 136 of the secondary server 130 stores in "/drbd_share", which is the storage synchronous area 142, a disk image 143 replicated from the disk image 123 received from the primary server 110. When the disk image 123 is changed on the primary server 110, the change is also reflected on the disk image 143 on the secondary server 130. The disk image 143 corresponds to the disk image 32 in FIG. 1.

For example, an ACT IP "172.31.0.10" is set to the storage synchronous area 122 of the primary server 110. The primary server 110 uses the ACT IP to mount the storage synchronous area 122 by the NFS. In the primary server 110, the storage synchronous area 122 is mounted on a predetermined mount point 124 such as "/mnt/nfs-client/". In addition, the secondary server 130 uses the ACT IP to mount the storage synchronous area 122 by the NFS. In the secondary server 130, the storage synchronous area 122 is mounted on a predetermined mount point 144 such as "/mnt/nfs-client/".

The primary server 110 boots the virtual system 125 by using the disk image 123 in the storage synchronous area 122 mounted by NFS. The primary server 110 causes the virtual system 125 to run as the active system. The primary server 110 causes the guest OS 114 and the call control app 115 to run on the virtual system 125. The primary server 110 obtains a snapshot of memory content of the virtual system 125 and transmits the snapshot to the secondary server 130 on a regular basis. The virtual system 125 corresponds to the virtual system 41 in FIG. 1.

The secondary server 130 boots the virtual system 145 as the standby system by using the disk image 123 in the storage synchronous area 122 mounted by NFS. The secondary server 130 stands by for execution of the guest OS 134 and the call control app 135 on the virtual system 145. The virtual system 145 corresponds to the virtual system 42 in FIG. 1. The secondary server 130 receives from the primary server 110 and stores a snapshot of memory content of the virtual system 125 on a regular basis. The secondary server 130, for example on every reception of a new snapshot, overwrites the snapshot previously received with the snapshot newly received.

Figure 4:
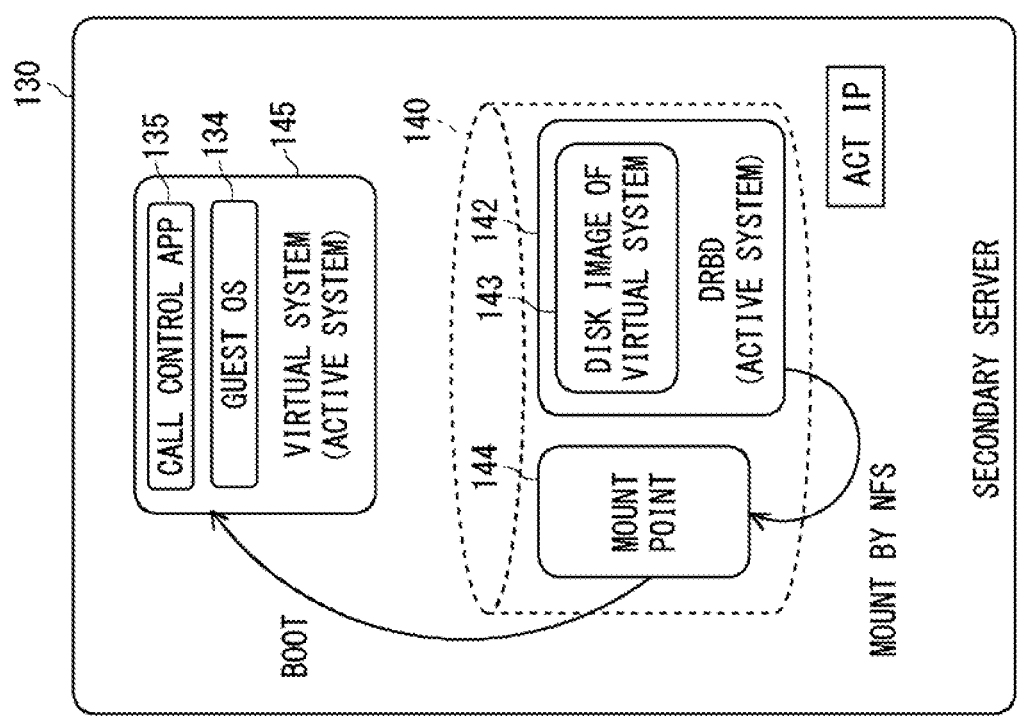
FIG. 4 is a block diagram showing the fault tolerant system in a case of a failure occurring in a primary server.
Figure 4:
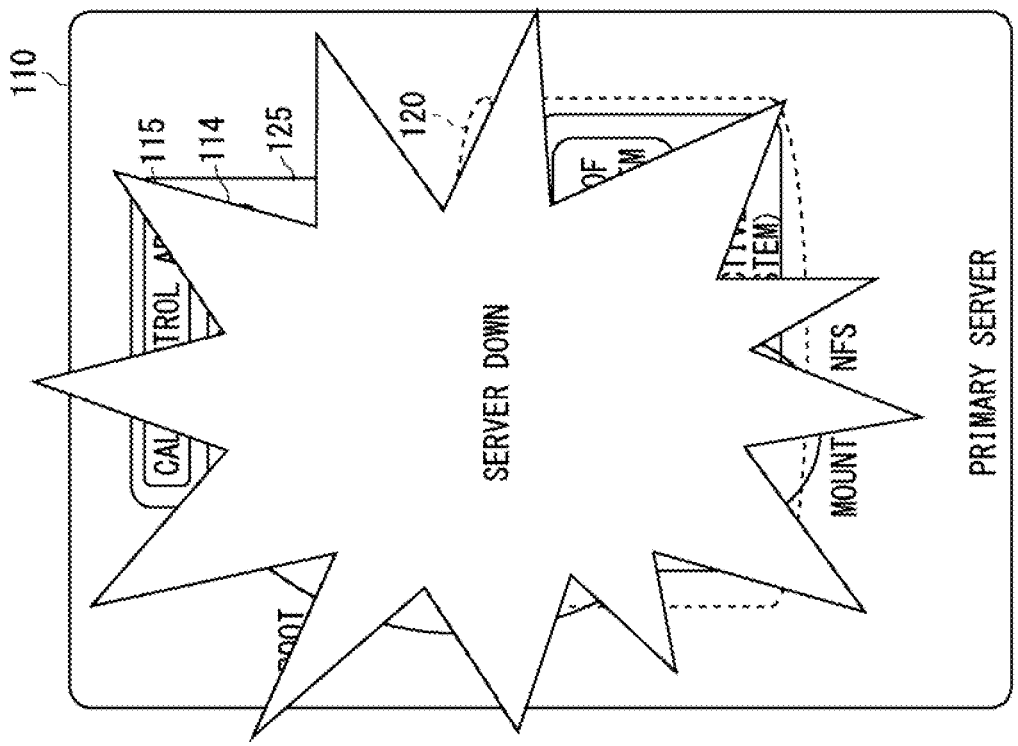

FIG. 4 shows the fault tolerant system 100 in a case of a failure occurring in the primary server 110. For example, when the communication with the primary server 110 is interrupted for some reason, the monitoring app 137 (see FIG. 2) detects a failure in the primary server 110. When the monitoring app 137 detects a failure in the primary server 110, the secondary server 130 switches the active system of the DRBD to the storage 140 of the secondary server. The secondary server 130 sets an ACT IP "172.31.0.10" to the storage synchronous area 142 in its own storage 140. The secondary server 130 uses the ACT IP "172.31.0.10" to mount the storage synchronous area 142 on the mount point 144 by the NFS.

Further, when the monitoring app 137 detects a failure in the primary server 110, the secondary server 130 switches the virtual system 145 from the standby system to the active system. The secondary server 130 uses the snapshot, which has been received prior to occurrence of the failure, to reproduce on the virtual system 145 the memory content in the virtual system 145 of when the snapshot was last obtained. In the virtual system 145 having been switched to the active system, the call control app 135 takes over the call control process having been provided by the virtual system 125 of the primary server 110, with reference to the memory content thus reproduced. Such a configuration enables the call control to be continuously provided to the telephone 201 (see FIG. 2) even when the primary server 110 is down.

Figure 5:
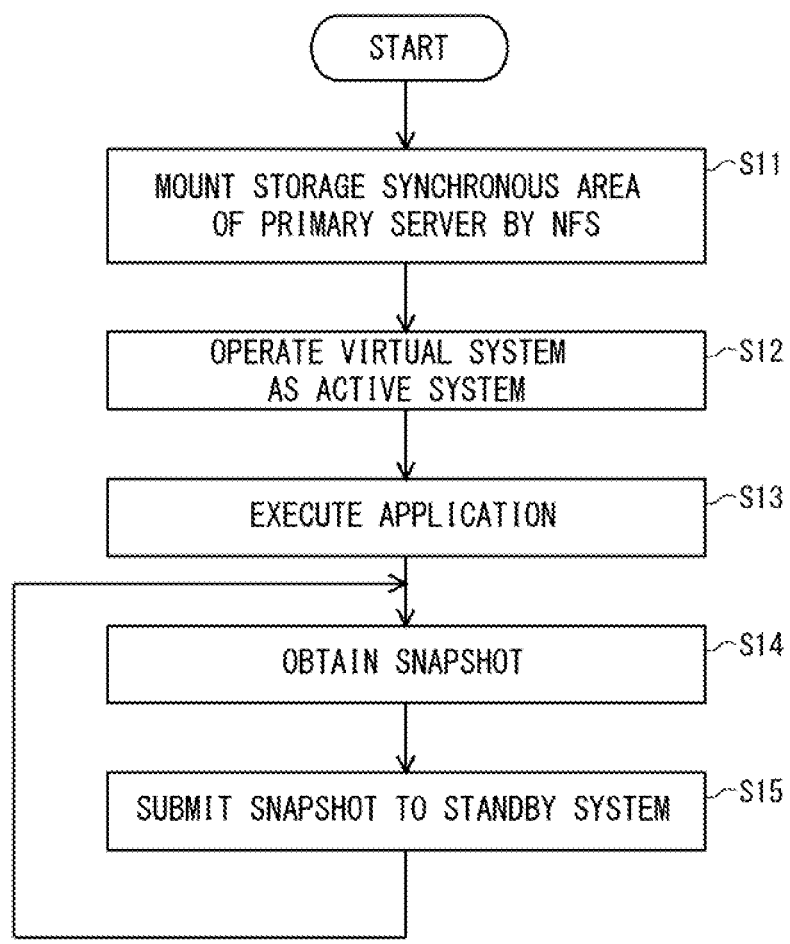
FIG. 5 is a flowchart showing an operation procedure during normal operation in the primary server.

Subsequently, an operation procedure of the fault tolerant system and the server, including a management method, is described. FIG. 5 shows an operation procedure during normal operation in the primary server 110. The primary server 110 uses the ACT IP to mount the storage synchronous area 122 in the storage 120 on the mount point 124 by the NFS (Step S11). The primary server 110 boots the virtual system 125 as an active system by using the disk image 123 stored in the storage synchronous area 122 thus mounted (step S12).

The primary server 110 boots the guest OS 114 on the virtual system 125, and executes the call control app 115 on the guest OS 114 (Step S13). The primary server 110 obtains a snapshot of memory content in the virtual system 125 (Step S14). The primary server 110 determines, for example, whether or not a predetermined checkpoint cycle has elapsed, and obtains the snapshot at every lapse of the checkpoint cycle. In obtaining the snapshot, the primary server 110 obtains the memory content having been changed since the previous snapshot was obtained. The primary server 110 transmits the snapshot thus obtained to the secondary server 130 (Step S15). When the content of the storage synchronous area 122 in the storage 120 has been changed, the primary server 110 transmits content of the change to the secondary server 130 in parallel with obtaining and transmitting the snapshot.

Figure 6:
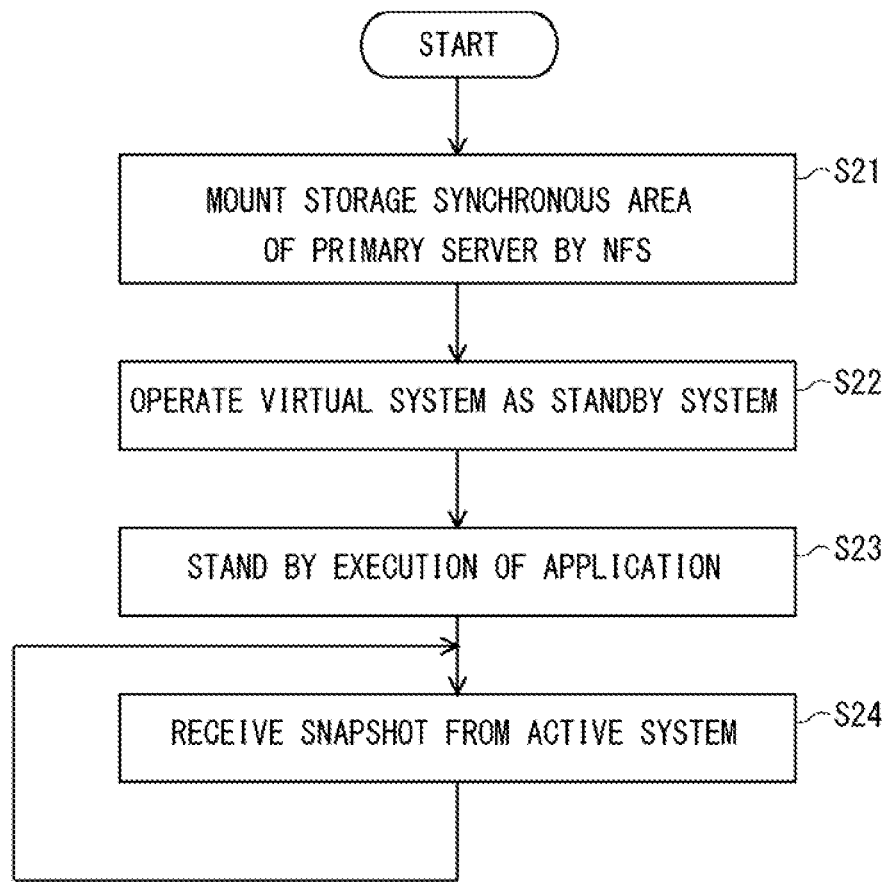
FIG. 6 is a flowchart showing an operation procedure during normal operation in a secondary server.

FIG. 6 shows an operation procedure during normal operation in the secondary server 130. The secondary server 130 uses the ACT IP to mount the storage synchronous area 122 in the storage 120 of the primary server 110 on the mount point 144 by the NFS (Step S21). The secondary server 130 boots the virtual system 145 as a standby system by using the disk image 123 stored in the storage synchronous area 122 thus mounted (Step S22).

The secondary server 130 boots the guest OS 134 on the virtual system 145, and stands by for execution of the call control app 135 on the guest OS 134 (Step S23). The secondary server 130 receives a snapshot of memory content in the virtual system 125 from the primary server 110 (Step S24). The secondary server 130 stores the snapshot thus received. The secondary server 130 receives content of the change in the storage synchronous area 122 in the storage 120 in parallel with receiving the snapshot. The secondary server 130 synchronizes the content of the storage synchronous area 142 in the storage 140 with the content of the storage synchronous area 122 in the storage 120.

Figure 7:
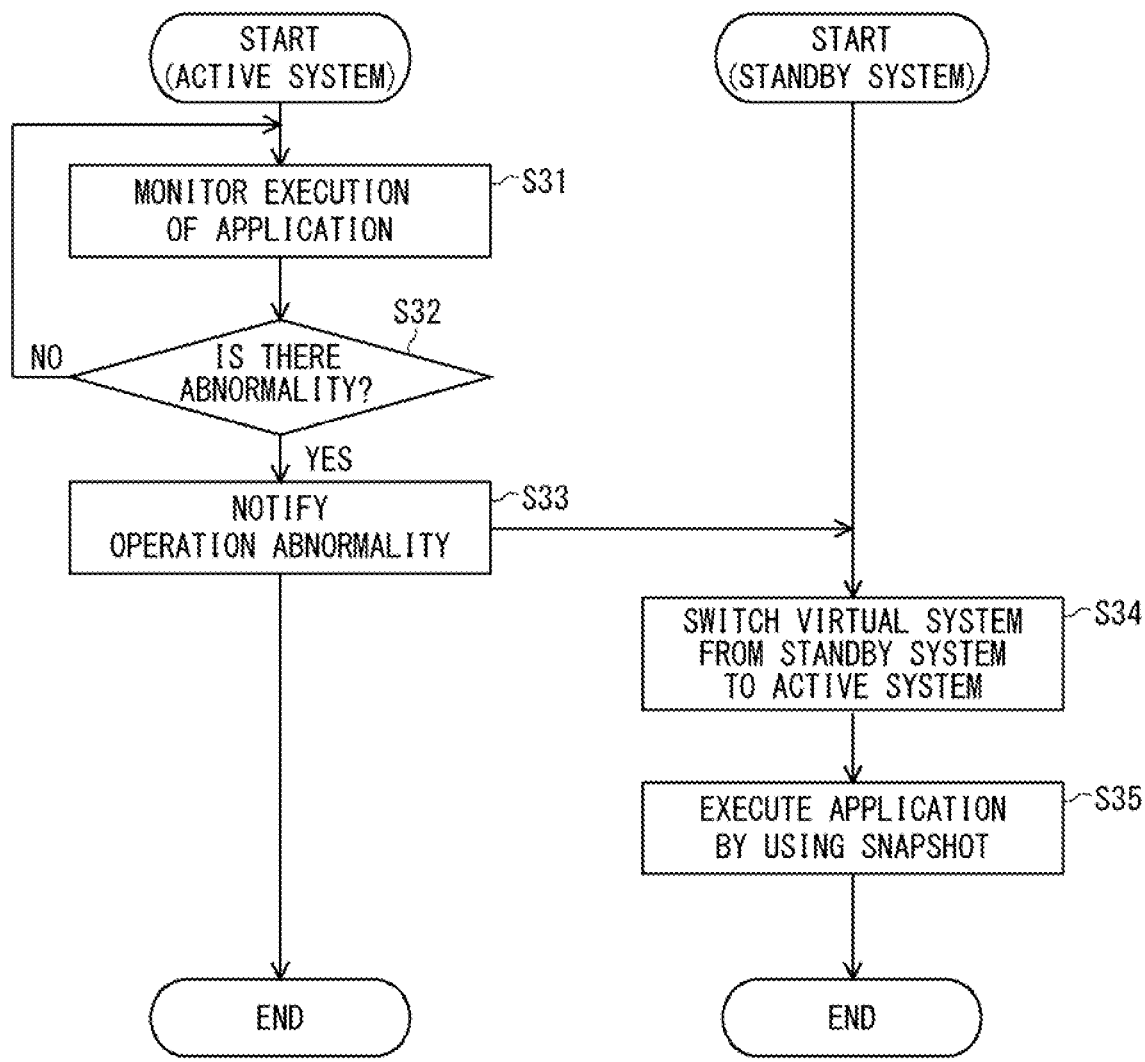
FIG. 7 is a flowchart showing an operation procedure in a case of a failure occurring in operation of a call control application in the primary server.

FIG. 7 shows an operation procedure in a case of a failure occurring in operation of the call control app 115 in the primary server 110. The primary server 110 uses the monitoring app 117 (see FIG. 2) to monitor operation of the call control app 115 executed on the guest OS 114 (Step S31). The primary server 110 determines whether or not the operation of the call control app 115 is abnormal (Step S32). When the operation of the call control app 115 is determined not to be abnormal, the primary server 110 returns to Step S31 and continues monitoring the operation of the call control app 115. When the operation of the call control app 115 is determined to be abnormal in Step S32, the primary server 110 notifies the secondary server 130 of the operation abnormality (Step S33).

When the operation abnormality is notified from the primary server 110, the secondary server 130 switches the virtual system 145 (see FIG. 4) from the standby system to the active system (Step S34). At this time, in a case in which there is no failure in the operation of the primary server 110 itself and the secondary server 130 can normally access the storage synchronous area 122 in the storage 120, switching of the active system of the DRBD does not take place. The secondary server 130 uses the snapshot received in Step S24 shown in FIG. 6 to execute the call control app 135 on the virtual system 145 switched to the active system (Step S35).

Figure 8:
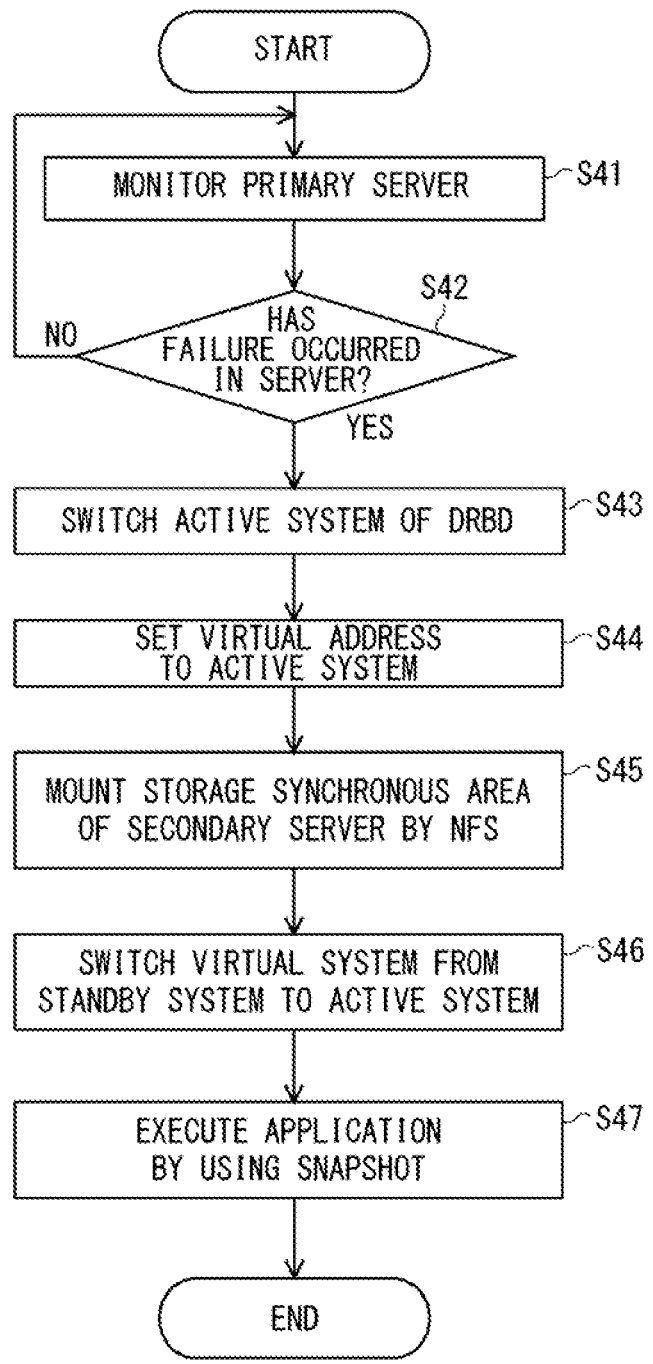
FIG. 8 is a flowchart showing an operation procedure in a case of a failure occurring in the primary server.

FIG. 8 shows an operation procedure in a case of a failure occurring in the primary server 110. The secondary server 130 uses the monitoring app 137 (see FIG. 2) to monitor the primary server 110 (Step S41). The secondary server 130 determines whether or not a failure has occurred in the primary server 110 (Step S42). When the primary server 110 is determined not to be abnormal, the secondary server 130 returns to Step S41 and continues monitoring the primary server 110.

When the primary server 110 is determined to be abnormal in Step S42, the secondary server 130 switches the active system of the DRBD (Step S43). In Step S43, the secondary server 130 switches the active system of the DRBD from the storage synchronous area 122 in the storage 120 of the primary server 110 to the storage synchronous area 142 in the storage 140 of the secondary server 130. At this time, the secondary server 130 sets a virtual address to the storage synchronous area 142 (Step S44). The secondary server 130 uses the virtual address to mount the storage synchronous area 142 on the mount point 144 by the NFS (Step S45).

The secondary server 130 switches the virtual system 145 from the standby system to the active system (Step S46). The secondary server 130 uses the snapshot received in Step S24 shown in FIG. 6 to execute the call control app 135 on the virtual system 145 switched to the active system (Step S47).

The disk image 143 stored in the storage synchronous area 142 is synchronized with the disk image 123 stored in the storage synchronous area 122 in the primary server 110. The call control app 135 can thus take over the call control process normally from the call control app 115 on the primary server 110 side.

In the present example embodiment, the storage synchronous areas in the storage 120 of the primary server 110 and in the storage 140 of the secondary server 130 are synchronized by employing the single primary mode of the DRBD. In the present example embodiment, the single primary mode of the DRBD is employed not for data synchronization, which is the typical application, but for synchronization of the disk image for booting the virtual system. In the present example embodiment, during normal operation, the storage synchronous area on the primary server 110 side is used as the active system of the DRBD, and the storage synchronous area on the secondary server 130 side is used as the standby system. Such a configuration enables synchronization of the content of the storage synchronous area during system operation.

In the present example embodiment, during normal operation, the virtual address is set to the storage synchronous area that stores the disk image of the virtual system on the primary server 110 side. The primary server 110 and the secondary server 130 each use the virtual address to mount the storage synchronous area on the primary server 110 side by the NFS. Such a configuration enables also the secondary server 130, which is the standby system of the DRBD, to boot the virtual system by using the same disk image as the primary server 110. In the present example embodiment, the secondary server 130 uses the virtual address to mount the storage synchronous area on the primary server 110 side by the NFS. An external disk device such as a shared disk array device is therefore not required.

In the present example embodiment, the memory content of the virtual system on the primary server 110 side and the memory content of the virtual system on the secondary server 130 side are synchronized through use of a live migration function or the like. When a failure occurs in the primary server 110, the storage synchronous area on the secondary server 130 side becomes the active system of the DRBD, and a virtual address is set to the storage synchronous area on the secondary server 130 side. Such a configuration enables the mount state of the NFS to be maintained in the secondary server 130, and the active system of the virtual system to be switched to the secondary server 130 side without halting the operating state of the virtual system.

In the foregoing, the secondary server 130 can maintain the mount state of the NFS with respect to the booted virtual system, while remaining in a state of being booted with the disk image on the primary server 110 side. Therefore, the secondary server 130 can maintain the NFS mount state without noticing that the disk image referred to by the virtual system has been switched from the primary server 110 side to the secondary server 130 side. In the present example embodiment, in the virtual system constructed on the hypervisor, the system status is not compiled into a database, and a real-time application configured to retain the state on memory is running. Even in such a case, by using memory synchronization in the virtual system together with storage synchronization, the running state of the virtual system can be continued on the secondary server 130 even after switching the active system of the DRBD due to a failure occurring in the primary server 110.

Figure 9:
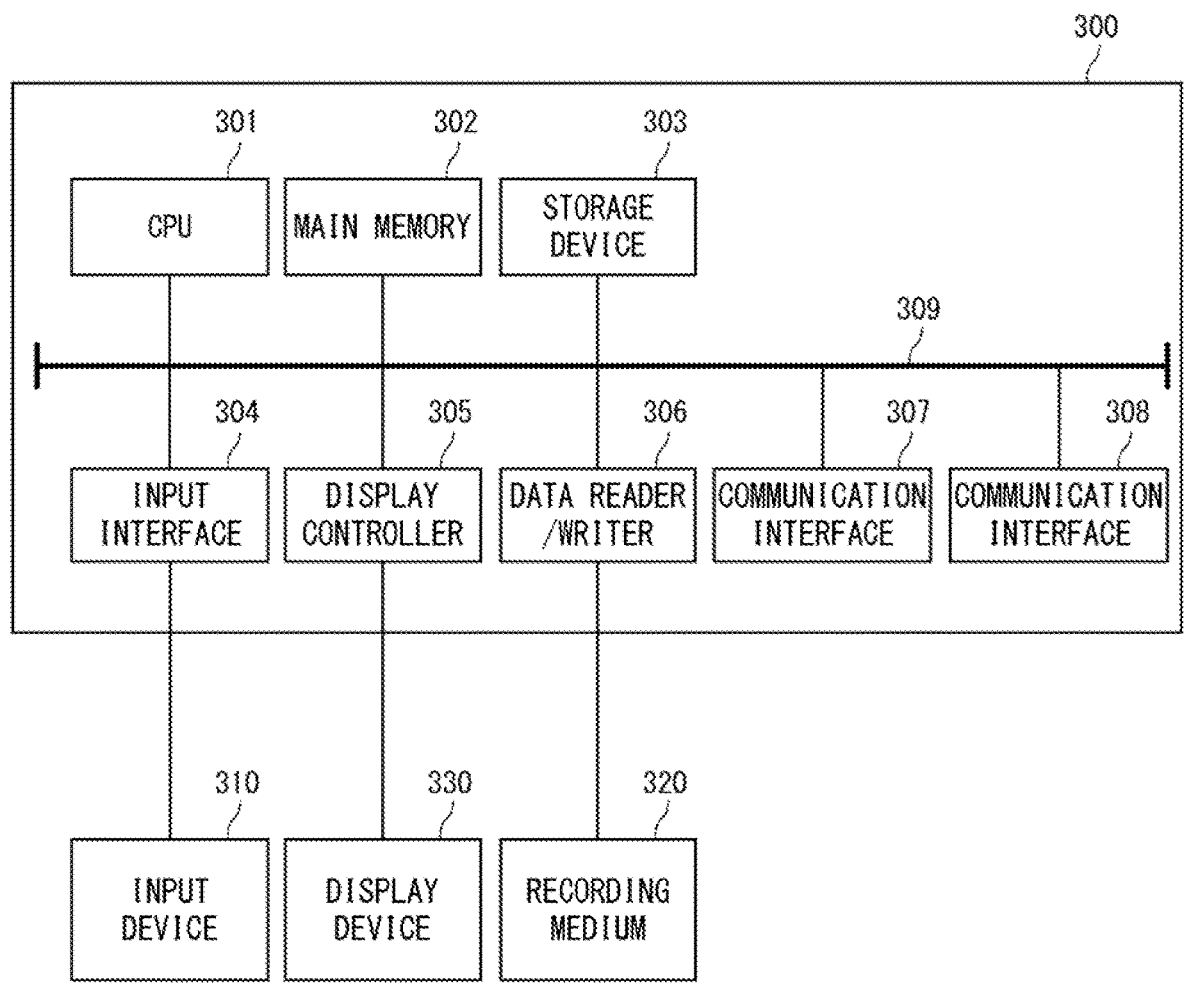
FIG. 9 is a block diagram showing a configuration example of a server apparatus.

Note that, as the primary server 110 and the secondary server 130, standard server apparatuses compliant to the virtualization technology can be used. FIG. 9 shows a configuration example of a server apparatus. A server apparatus 300 is provided with a CPU (Central Processing Unit) 301, main memory 302, a storage device 303, an input interface 304, a display controller 305, a data reader/writer 306, a communication interface 307, and a communication interface 308. In the server apparatus 300, these elements are connected to each other in a manner enabling data communication via a bus 309.

The CPU 301 deploys a program (code) stored in the storage device 303 on the main memory 302 and then executes the program to carry out various calculations. The main memory 302 is typically a volatile storage device such as DRAM (Dynamic Random Access Memory). A program for causing the server apparatus 300 to function as the primary server 110 or the secondary server 130 is provided, for example, in a state of being stored in a computer-readable recording medium 320. The program may also be provided via a network such as the Internet.

The aforementioned program may be stored by using various types of non-transitory computer-readable media and provided to a computer (server apparatus). The non-transitory computer-readable medium includes various types of tangible recording media. Examples of the non-transitory computer-readable medium include: a magnetic recording medium such as a flexible disk, a magnetic tape, or a hard disk; a magneto-optical recording medium such as a magneto-optical disk; an optical disk medium such as a CD (compact disc) or a DVD (digital versatile disk); and semiconductor memory such as mask ROM (read only memory), PROM (programmable ROM), EPROM (erasable PROM), flash ROM, or RAM (random access memory). Alternatively, the program may be provided to a computer through use of various types of transitory computer-readable media. Examples of the transitory computer-readable medium include an electrical signal, an optical signal, and an electromagnetic wave. The transitory computer-readable media can provide the program to a computer via a wired communication channel such as an electric wire and a fiber-optic cable, or a wireless communication channel.

The storage device 303 is configured as, for example, a disk device such as a hard disk drive, or a semiconductor storage device such as flash memory. The storage device 303 corresponds to the storage 120 of the primary server 110 or the storage 140 of the secondary server 130. The input interface 304 mediates data transmission between the CPU 301 and an input device 310 such as a keyboard and a mouse. The display controller 305 is connected to the display device 330 and controls display on the display device 330. The data reader/writer 306 mediates data transmission between the CPU 301 and the recording medium 320. The data reader/writer 306, for example, reads the program from the recording medium 320 and transmits the program thus read to the CPU 301.

The communication interfaces 307, 308 mediate data transmission between the CPU 301 and other devices or networks. For example, the communication interface 307 corresponds to the NIC 118 of the primary server 110, and the communication interface 308 corresponds to the NIC 119 of the primary server 110. Alternatively, the communication interface 307 corresponds to the NIC 138 of the secondary server 130, and the communication interface 308 corresponds to the NIC 139 of the secondary server 130.

In the foregoing, the example embodiment of the present disclosure has been described in detail; however, the present disclosure is not limited to the above-described example embodiment and modifications and changes made without departing from the spirit of the present disclosure are also encompassed by the present disclosure.

For example, a part or all of the above-described example embodiment may be stated as in the supplementary note presented below, but is not limited thereto.

[Supplementary Note 1]

A fault tolerant system comprising:

a first server including a first storage configured to store in a storage synchronous area a disk image of a virtual system constructed by using a server virtualization mechanism; and a second server including a second storage, wherein a virtual address is set to the storage synchronous area in the first storage, the first server and the second server each use the virtual address to mount the storage synchronous area in the first storage by NFS (Network File System), the first server operates the virtual system as an active system by using the disk image in the storage synchronous area thus mounted, executes an application on the virtual system thus operated, and obtains and transmits a snapshot of memory content of the virtual system to the second server, the second server operates the virtual system as a standby system by using the disk image in the storage synchronous area thus mounted, stands by for execution of an application on the virtual system thus operated, and receives and stores the snapshot from the first server, the first server replicates content of the storage synchronous area in the first storage to the storage synchronous area in the second storage, and the second server, when a failure occurs in the first server, sets a virtual address to the storage synchronous area in the second storage, uses the virtual address to mount the storage synchronous area in the second storage by the NFS, and uses the snapshot being stored to execute the application on the virtual system.

[Supplementary Note 2]

The fault tolerant system according to supplementary note 1, wherein the first server obtains and transmits the snapshot to the second server at predetermined time intervals.

[Supplementary Note 3]

The fault tolerant system according to supplementary note 1 or 2, wherein the second server monitors the first server and, when a failure occurs in the first server, switches the storage of the second server from the standby system to the active system.

[Supplementary Note 4]

The fault tolerant system according to any one of supplementary notes 1 to 3, wherein the first server and the second server each monitor execution of the application running on the virtual system operating on each of the first server and the second server, and the second server, when a fault occurs in execution of the application running on the virtual system operating on the first server, switches the application running on the virtual system operating on the second server from a standby state to an active state.

[Supplementary Note 5]

The fault tolerant system according to any one of supplementary notes 1 to 4, wherein the content of the storage synchronous area in the first storage is replicated to the storage synchronous area in the second storage by employing a single primary mode of a DRBD (Distributed Replicated Block Device).

[Supplementary Note 6]

The fault tolerant system according to any one of supplementary notes 1 to 5, wherein the application is a call control application configured to control a call of a device having a telephone function connected to the first server and the second server via a network.

[Supplementary Note 7]

The fault tolerant system according to any one of supplementary notes 1 to 6, wherein the application manages a system status on memory without compiling the system status into a database.

[Supplementary Note 8]

A server comprising:

a storage configured to store in a storage synchronous area a disk image of a virtual system constructed by using a server virtualization mechanism; and an application configured to run on the virtual system, wherein the server uses a virtual address being set to the storage synchronous area in the storage to mount the storage synchronous area in the storage by NFS (Network File System), operates the virtual system as an active system by using the disk image in the storage synchronous area thus mounted, executes the application on the virtual system thus operated, obtains and transmits a snapshot of memory content of the virtual system to another server configured to mount the storage synchronous area in the storage by using the virtual address, and replicates content of the storage synchronous area in the storage to a storage synchronous area in a storage of the another server.

[Supplementary Note 9]

The server according to supplementary note 8, wherein the server obtains and transmits the snapshot to the another server at predetermined time intervals.

[Supplementary Note 10]

The server according to supplementary note 8 or 9, wherein content of the storage synchronous area in the storage is replicated to the storage synchronous area in the storage of the another server by employing a single primary mode of a DRBD (Distributed Replicated Block Device).

[Supplementary Note 11]

A server comprising:

a storage; and an application configured to run on a virtual system constructed by using a server virtualization mechanism, wherein the server uses a virtual address being set to a storage synchronous area in a storage of another server configured to store a disk image of the virtual system to the storage synchronous area to mount the storage synchronous area in the storage of the another server by NFS (Network File System), operates the virtual system as a standby system by using the disk image in the storage synchronous area thus mounted, stands by for execution of an application on the virtual system thus operated, receives from the another server and stores a snapshot of memory content of the virtual system operated as an active system on the another server by using the disk image, in which an application is executed on the system operated as the active system, and, when a failure occurs in the another server, sets a virtual address to a storage synchronous area in the storage of the server to which content of the storage synchronous area in the storage of the another server is replicated, uses the virtual address to mount the storage synchronous area in the storage of the server by the NFS, and uses the snapshot being stored to execute the application on the virtual system.

[Supplementary Note 12]

The server according to supplementary note 11, wherein the server monitors the another server and, when a failure occurs in the another server, switches the storage of the server from the standby system to the active system.

[Supplementary Note 13]

The server according to supplementary note 11 or 12, wherein the server monitors execution of the application running on the virtual system operating on the another server, and, when a fault occurs in execution of the application running on the virtual system operating on the another server, switches the application running on the virtual system operating on the server from a standby state to an active state.

[Supplementary Note 14]

An operation method of a fault tolerant system, comprising:

using, by a first server including a first storage configured to store in a storage synchronous area a disk image of a virtual system constructed by using a server virtualization mechanism, and a second server including a second storage, respectively, a virtual address being set to the storage synchronous area in the first storage to mount the storage synchronous area in the first storage by NFS (Network File System), operating, by the first server, the virtual system as an active system by using the disk image in the storage synchronous area thus mounted, executing, by the first server, an application on the virtual system thus operated, and obtaining and transmitting, by the first server, a snapshot of memory content of the virtual system to the second server, operating, by the second server, the virtual system as a standby system by using the disk image in the storage synchronous area thus mounted, standing by, by the second server, for execution of an application on the virtual system thus operated and storing, by the second server, the snapshot received from the first server, replicating, by the first server, content of the storage synchronous area in the first storage to the storage synchronous area in the second storage, and setting, by the second server, a virtual address to the storage synchronous area in the second storage when a failure occurs in the first server, using, by the second server, the virtual address to mount the storage synchronous area in the second storage by the NFS, and using, by the second server, the snapshot being stored to execute the application on the virtual system.

[Supplementary Note 15]

The operation method of a fault tolerant system according to supplementary note 14, wherein the first server obtains and transmits the snapshot to the second server at predetermined time intervals.

[Supplementary Note 16]

The operation method of a fault tolerant system according to supplementary note 14 or 15, wherein the second server monitors the first server and, when a failure occurs in the first server, switches the storage of the second server from the standby system to the active system.

[Supplementary Note 17]

The operation method of a fault tolerant system according to any one of supplementary notes 14 to 16, wherein the first server and the second server each monitor execution of the application running on the virtual system operating on each of the first server and the second server, and the second server, when a fault occurs in execution of the application running on the virtual system operating on the first server, switches the application running on the virtual system operating on the second server from a standby state to an active state.

[Supplementary Note 18]

The operation method of a fault tolerant system according to any one of supplementary notes 14 to 17, wherein the content of the storage synchronous area in the first storage is replicated to the storage synchronous area in the second storage by employing a single primary mode of a DRBD (Distributed Replicated Block Device).

[Supplementary Note 19]

The operation method of a fault tolerant system according to any one of supplementary notes 14 to 18, wherein the application is a call control application configured to control a call of a device having a telephone function connected to the first server and the second server via a network.

[Supplementary Note 20]

The operation method of a fault tolerant system according to any one of supplementary notes 14 to 19, wherein the application manages a system status on memory without building a database of the system status.

[Supplementary Note 21]

An operation method of a server comprising:

using a virtual address being set to a storage synchronous area in a storage of the server configured to store in the storage synchronous area a disk image of a virtual system constructed by using a server virtualization mechanism, to mount the storage synchronous area in the storage by NFS (Network File System);

operating the virtual system as an active system by using the disk image in the storage synchronous area thus mounted;

executing an application on the virtual system thus operated;

obtaining and transmitting a snapshot of memory content of the virtual system to another server configured to mount the storage synchronous area in the storage by using the virtual address; and replicating content of the storage synchronous area in the storage to a storage synchronous area in a storage of the another server.

[Supplementary Note 22]

The operation method of a server according to supplementary note 21, wherein the snapshot is obtained and transmitted to the another server at predetermined time intervals.

[Supplementary Note 23]

The operation method of a server according to supplementary note 21 or 22, wherein content of the storage synchronous area in the storage is replicated to the storage synchronous area in the storage of the another server by employing a single primary mode of a DRBD (Distributed Replicated Block Device).

[Supplementary Note 24]

An operation method of a server comprising:

using a virtual address being set to a storage synchronous area in a storage of another server configured to store in the storage synchronous area a disk image of a virtual system constructed by using a server virtualization mechanism, to mount the storage synchronous area in the storage of the another server by NFS (Network File System);

operating the virtual system as a standby system by using the disk image in the storage synchronous area thus mounted;

standing by for execution of an application on the virtual system thus operated;

receiving from the another server and storing a snapshot of memory content of virtual system operated as an active system on the another server by using the disk image, in which an application is executed on the system operated as the active system; and when a failure occurs in the another server, setting a virtual address to a storage synchronous area in the storage of the server to which content of the storage synchronous area in the storage of the another server is replicated, using the virtual address to mount the storage synchronous area in the storage of the server by the NFS, and using the snapshot being stored to execute the application on the virtual system.

[Supplementary Note 25]

The operation method of a server according to supplementary note 24, further comprising:

monitoring the another server; and when a failure occurs in the another server, switching the storage of the server from the standby system to the active system.

[Supplementary Note 26]

The operation method of a server according to supplementary note 24 or 25, further comprising:

monitoring execution of the application running on the virtual system operating on the another server; and when a fault occurs in execution of the application running on the virtual system operating on the another server, switching the application running on the virtual system operating on the server from a standby state to an active state.

[Supplementary Note 27]

A program configured to cause a server to carry out the operation method of a server according to any one of supplementary notes 21 to 26.

The present application claims the priority of Japanese Patent Application No. 2019-100508 filed on May 29, 2019, the entire disclosure of which is incorporated herein by reference.

REFERENCE SIGNS LIST

10 FAULT TOLERANT SYSTEM
11 FIRST SERVER
12 SECOND SERVER
21, 22 STORAGE
31, 32 DISK IMAGE
41, 42 VIRTUAL SYSTEM
51, 52 APPLICATION
100 FAULT TOLERANT SYSTEM
110 PRIMARY SERVER
111, 131 HARDWARE
112, 132 HOST OS
113, 133 QEMU
114, 134 GUEST OS
115, 135 CALL CONTROL APPLICATION
116, 136 DRBD
117, 137 MONITORING APPLICATION
118, 119, 138, 139 NIC
120, 140 STORAGE
121, 141 HYPERVISOR
122, 142 STORAGE SYNCHRONOUS AREA
123, 143 DISK IMAGE OF THE VIRTUAL SYSTEM
124, 144 MOUNT POINT
125, 145 VIRTUAL SYSTEM
130 SECONDARY SERVER

What is claimed is:

1. A fault tolerant system comprising:
a first server including a first storage configured to store in a storage synchronous area a disk image of a virtual system constructed by using a server virtualization mechanism; and
a second server including a second storage, wherein
a virtual address is set to the storage synchronous area in the first storage, the first server and the second server each use the virtual address to mount the storage synchronous area in the first storage by NFS (Network File System), the first server operates the virtual system as an active system by using the disk image in the storage synchronous area thus mounted, executes an application on the virtual system thus operated, and obtains and transmits a snapshot of memory content of the virtual system to the second server, the second server operates the virtual system as a standby system by using the disk image in the storage synchronous area thus mounted, stands by for execution of an application on the virtual system thus operated, and receives and stores the snapshot from the first server, the first server replicates content of the storage synchronous area in the first storage to the storage synchronous area in the second storage, and the second server, when a failure occurs in the first server, sets a virtual address to the storage synchronous area in the second storage, uses the virtual address to mount the storage synchronous area in the second storage by the NFS, and uses the snapshot being stored to execute the application on the virtual system.

2. The fault tolerant system according to claim 1, wherein the first server obtains and transmits the snapshot to the second server at predetermined time intervals.

3. The fault tolerant system according to claim 1, wherein the second server monitors the first server and, when a failure occurs in the first server, switches the second storage of the second server from the standby system to the active system.

4. The fault tolerant system according to claim 1, wherein the first server and the second server each monitor execution of the application running on the virtual system operating on each of the first server and the second server, and the second server, when a fault occurs in execution of the application running on the virtual system operating on the first server, switches the application running on the virtual system operating on the second server from a standby state to an active state.

5. The fault tolerant system according to claim 1, wherein the content of the storage synchronous area in the first storage is replicated to the storage synchronous area in the second storage by employing a single primary mode of a DRBD (Distributed Replicated Block Device).

6. The fault tolerant system according to claim 1, wherein the application is a call control application configured to control a call of a device having a telephone function connected to the first server and the second server via a network.

7. The fault tolerant system according to claim 1, wherein the application manages a system status on memory without compiling the system status into a database.

8. A server comprising:

a storage configured to store in a storage synchronous area a disk image of a virtual system constructed by using a server virtualization mechanism; and an application configured to run on the virtual system, wherein the server uses a virtual address being set to the storage synchronous area in the storage to mount the storage synchronous area in the storage by NFS (Network File System), operates the virtual system as an active system by using the disk image in the storage synchronous area thus mounted, executes the application on the virtual system thus operated, obtains a snapshot of memory content of the virtual system, transmits the obtained snapshot to another server configured to mount the storage synchronous area in the storage by using the virtual address, operate a virtual system as a standby system by using the disk image in the storage synchronous area thus mounted, and stand by for execution of an application on the virtual system thus operated, and replicates content of the storage synchronous area in the storage to a storage synchronous area in a storage of the another server.

9. The server according to claim 8, wherein the server obtains and transmits the snapshot to the another server at predetermined time intervals.

10. The server according to claim 8, wherein content of the storage synchronous area in the storage is replicated to the storage synchronous area in the storage of the another server by employing a single primary mode of a DRBD (Distributed Replicated Block Device).

11. A server comprising:

a storage; and an application configured to run on a virtual system constructed by using a server virtualization mechanism, wherein the server uses a virtual address being set to a storage synchronous area in a storage of another server configured to store a disk image of the virtual system to the storage synchronous area to mount the storage synchronous area in the storage of the another server by NFS (Network File System), operates the virtual system as a standby system by using the disk image in the storage synchronous area thus mounted, stands by for execution of an application on the virtual system thus operated, receives from the another server and stores a snapshot of memory content of the virtual system operated as an active system on the another server by using the disk image, in which an application is executed on the system operated as the active system, and, when a failure occurs in the another server, sets a virtual address to a storage synchronous area in the storage of the server to which content of the storage synchronous area in the storage of the another server is replicated, uses the virtual address to mount the storage synchronous area in the storage of the server by the NFS, and uses the snapshot being stored to execute the application on the virtual system.

12. The server according to claim 11, wherein the server monitors the another server and, when a failure occurs in the another server, switches the storage of the server from the standby system to the active system.

13. The server according to claim 11, wherein the server monitors execution of the application running on the virtual system operating on the another server, and, when a fault occurs in execution of the application running on the virtual system operating on the another server, switches the application running on the virtual system operating on the server from a standby state to an active state.

14. An operation method of a fault tolerant system, comprising:

using, by a first server including a first storage configured to store in a storage synchronous area a disk image of a virtual system constructed by using a server virtualization mechanism, and a second server including a second storage, respectively, a virtual address being set to the storage synchronous area in the first storage to mount the storage synchronous area in the first storage by NFS (Network File System), operating, by the first server, the virtual system as an active system by using the disk image in the storage synchronous area thus mounted, executing, by the first server, an application on the virtual system thus operated, and obtaining and transmitting, by the first server, a snapshot of memory content of the virtual system to the second server, operating, by the second server, the virtual system as a standby system by using the disk image in the storage synchronous area thus mounted, standing by, by the second server, for execution of an application on the virtual system thus operated and storing, by the second server, the snapshot received from the first server, replicating, by the first server, content of the storage synchronous area in the first storage to the storage synchronous area in the second storage, and setting, by the second server, a virtual address to the storage synchronous area in the second storage when a failure occurs in the first server, using, by the second server, the virtual address to mount the storage synchronous area in the second storage by the NFS, and using, by the second server, the snapshot being stored to execute the application on the virtual system.

15. The operation method of a fault tolerant system according to claim 14, wherein the first server obtains and transmits the snapshot to the second server at predetermined time intervals.

16. The operation method of a fault tolerant system according to claim 14, wherein the second server monitors the first server and, when a failure occurs in the first server, switches the second storage of the second server from the standby system to the active system.

17. The operation method of a fault tolerant system according to claim 14, wherein the first server and the second server each monitor execution of the application running on the virtual system operating on each of the first server and the second server, and the second server, when a fault occurs in execution of the application running on the virtual system operating on the first server, switches the application running on the virtual system operating on the second server from a standby state to an active state.

18. The operation method of a fault tolerant system according to claim 14, wherein the content of the storage synchronous area in the first storage is replicated to the storage synchronous area in the second storage by employing a single primary mode of a DRBD (Distributed Replicated Block Device).

19. The operation method of a fault tolerant system according to claim 14, wherein the application is a call control application configured to control a call of a device having a telephone function connected to the first server and the second server via a network.

20. The operation method of a fault tolerant system according to claim 14, wherein the application manages a system status on memory without building a database of the system status.

* * * * *